US009832316B1

(12) United States Patent
Prasad et al.

(10) Patent No.: US 9,832,316 B1
(45) Date of Patent: Nov. 28, 2017

(54) CUSTOMER SERVICE MODEL-BASED CALL ROUTING AND/OR SCHEDULING SYSTEM AND METHOD

(71) Applicant: United Services Automobile Association (USAA), San Antonio, TX (US)

(72) Inventors: Bharat Prasad, San Antonio, TX (US); Gunjan C. Vijayvergia, San Antonio, TX (US); Vijay Jayapalan, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 0 days.

(21) Appl. No.: 15/348,779

(22) Filed: Nov. 10, 2016

Related U.S. Application Data

(60) Provisional application No. 62/254,616, filed on Nov. 12, 2015.

(51) Int. Cl.
  *H04M 3/51* (2006.01)
  *H04M 3/523* (2006.01)
  *G06Q 10/06* (2012.01)
  *H04M 3/42* (2006.01)

(52) U.S. Cl.
  CPC ........ *H04M 3/5235* (2013.01); *G06Q 10/067* (2013.01); *G06Q 10/06311* (2013.01); *H04M 3/42068* (2013.01); *H04M 2203/558* (2013.01); *H04M 2203/6072* (2013.01)

(58) Field of Classification Search
  None
  See application file for complete search history.

(56) References Cited

U.S. PATENT DOCUMENTS

| | | | |
|---|---|---|---|
| 8,488,774 B2 | 7/2013 | Mahalaha et al. | |
| 8,705,725 B1 | 4/2014 | Zettner | |
| 2008/0240376 A1* | 10/2008 | Conway | H04M 3/5232 379/211.01 |
| 2009/0222313 A1* | 9/2009 | Kannan | G06Q 30/02 705/7.31 |
| 2016/0180248 A1* | 6/2016 | Regan | G06F 17/30 706/12 |

\* cited by examiner

*Primary Examiner* — Harry S Hong
(74) *Attorney, Agent, or Firm* — Fletcher Yoder, PC

(57) ABSTRACT

A method of routing a customer to a desired representative of a call center includes, in accordance with an embodiment of the present disclosure, receiving a communication from the customer. The method also includes identifying, within a database saved to a server, a customer account associated with the customer, and identifying data indicative of one or more life event entries saved to the customer account and corresponding with one or more life events of the customer. The method also includes applying the identified data indicative of the one or more life event entries to a history-based statistical models, where each history-based statistical model represents a corresponding call routing channel. The method also includes assigning a probability score for each history-based statistical model, where each probability score represents a likelihood that the corresponding call routing channel represented by the history-based statistical model is desired by the customer. The method also includes routing, via a switch, the customer to the desired representative via the call routing channel associated with the desired representative.

20 Claims, 5 Drawing Sheets

CUSTOMER SERVICE MODEL-BASED CALL ROUTING AND/OR SCHEDULING SYSTEM AND METHOD

CROSS REFERENCE TO RELATED APPLICATION

This application claims priority to and the benefit of U.S. Provisional Application No. 62/254,616, entitled "CUSTOMER SERVICE MODEL-BASED CALL ROUTING SYSTEM AND METHOD," filed Nov. 12, 2015, which is hereby incorporated by reference in its entirety for all purposes.

BACKGROUND

The present disclosure relates generally to systems and methods for routing customer calls to customer service representatives of a call center, and more specifically to systems and methods for routing customer calls to customer service representatives based on customer-specific data.

Modern businesses offer an array of customer service options that enable a customer to seek help for questions regarding, for example, interactions between the customer and products offered by the business. Because modern businesses are often diverse (e.g., having several different business operations or services), connection between the customer and an appropriate customer service option (e.g., a particular customer service representative corresponding with, for example, a particular business operation or service) may be cumbersome, inefficient, and time consuming. Accordingly, it is now recognized that improved routing of the customer to the appropriate customer service option (e.g., representative) is desired.

BRIEF DESCRIPTION

A method of routing a customer to a desired representative of a call center includes, in accordance with an embodiment of the present disclosure, receiving a communication from the customer. The method also includes identifying, within a database saved to a server, a customer account associated with the customer, and identifying data indicative of one or more life event entries saved to the customer account and corresponding with one or more life events of the customer. The method also includes applying the identified data indicative of the one or more life event entries to history-based statistical models, where each history-based statistical model represents a corresponding call routing channel. The method also includes assigning a probability score for each history-based statistical model, where each probability score represents a likelihood that the corresponding call routing channel represented by the history-based statistical model is desired by the customer. The method also includes routing, via a switch, the customer to the desired representative via the call routing channel associated with the desired representative.

A system for routing a customer to a desired representative of a call center, in accordance with an embodiment of the present disclosure, includes a server configured to store a customer account corresponding with the customer thereon, where the customer account includes a data fingerprint having life event entries corresponding with the customer. The system also includes one or more processors configured to apply, in response to a communication from the customer, the data fingerprint to history-based statistical models to generate a probability score for each history-based statistical model, where each history-based statistical model represents a corresponding call routing channel, and where each probability score represents a likelihood that the corresponding call routing channel is desired by the customer. The system also includes a switch configured to route the customer, based at least in part on the probability scores of the history-based statistical models, through one of the corresponding call routing channels.

A call routing system, in accordance with an embodiment of the present disclosure, includes a server configured to host a database having a customer account stored thereon, where the customer account is associated with a customer, and where the customer account includes a data fingerprint having data indicative of life event entries of the customer. The system also includes a switch having at least one processor and memory, where the memory is configured to store instructions thereon that, when executed by the processor, cause the switch to: (a) identify the customer corresponding with a communication from the customer, (b) retrieve or receive, from the database hosted by the server, information from the customer account associated with the customer, (c) apply the data indicative of the life event entries to history based statistical models, where each history-based statistical model represents a corresponding call routing channel, (d) generate probability scores corresponding with the history based statistical models, where each probability score represents a likelihood that the call routing channel associated with the corresponding history-based statistical model is desired by the customer, and (e) route the customer to one of the corresponding call routing channels based at least in part on the probability scores.

DRAWINGS

These and other features, aspects, and advantages of the present disclosure will become better understood when the following detailed description is read with reference to the accompanying drawings in which like characters represent like parts throughout the drawings, wherein.

Figure 1:
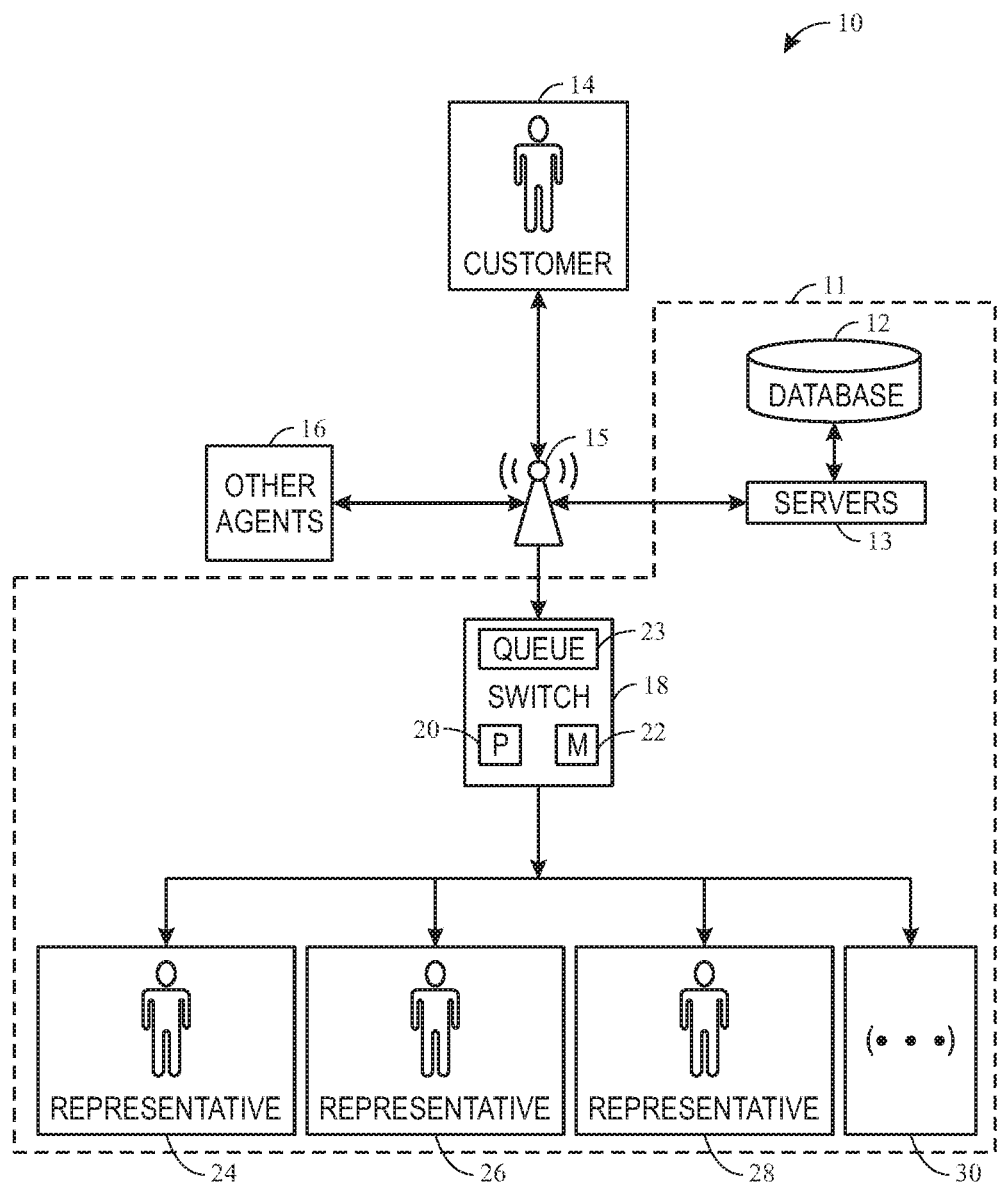
FIG. 1 is a schematic representation of an embodiment of a customer service call center, in accordance with an aspect of the present disclosure.
Figure 4:
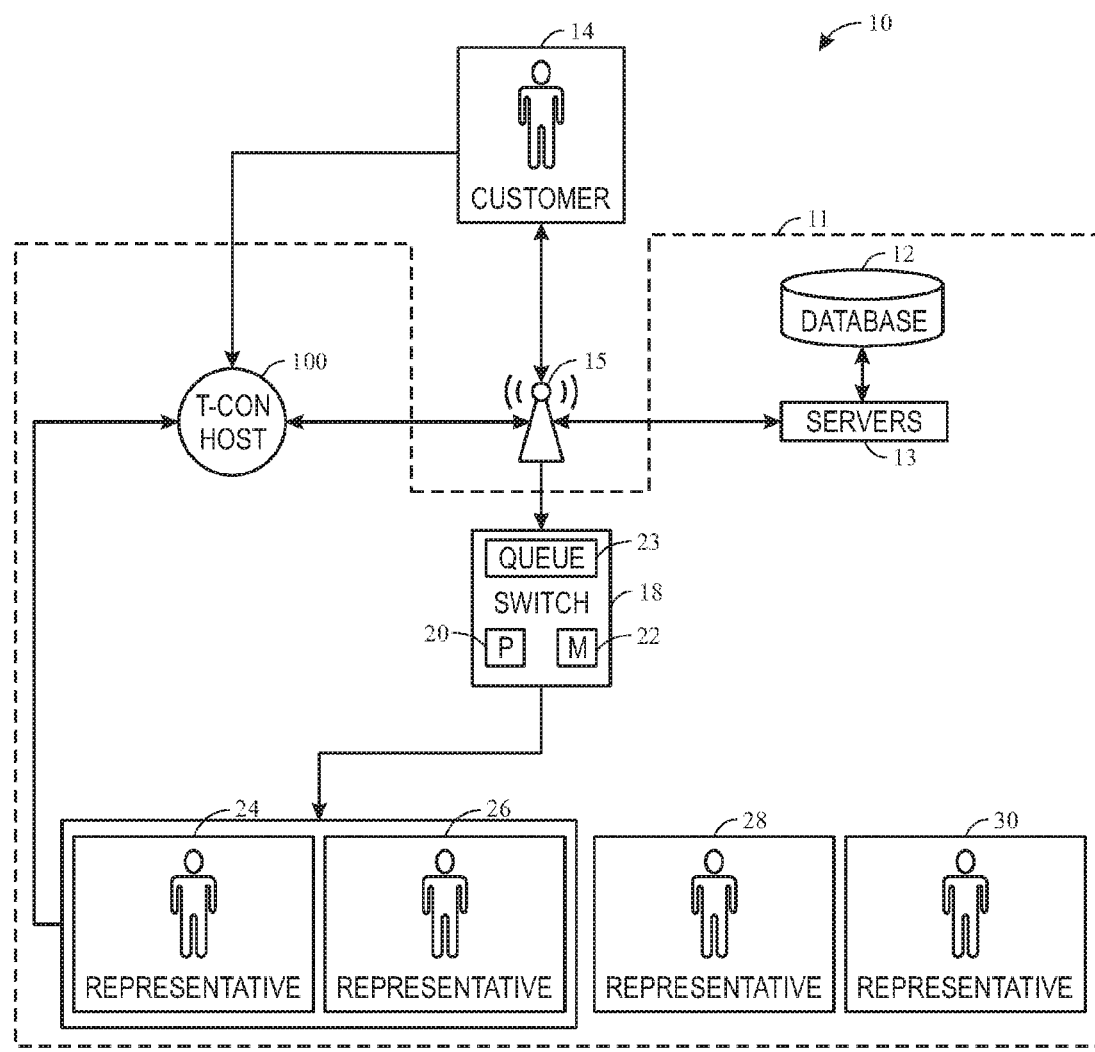
Figure 5:
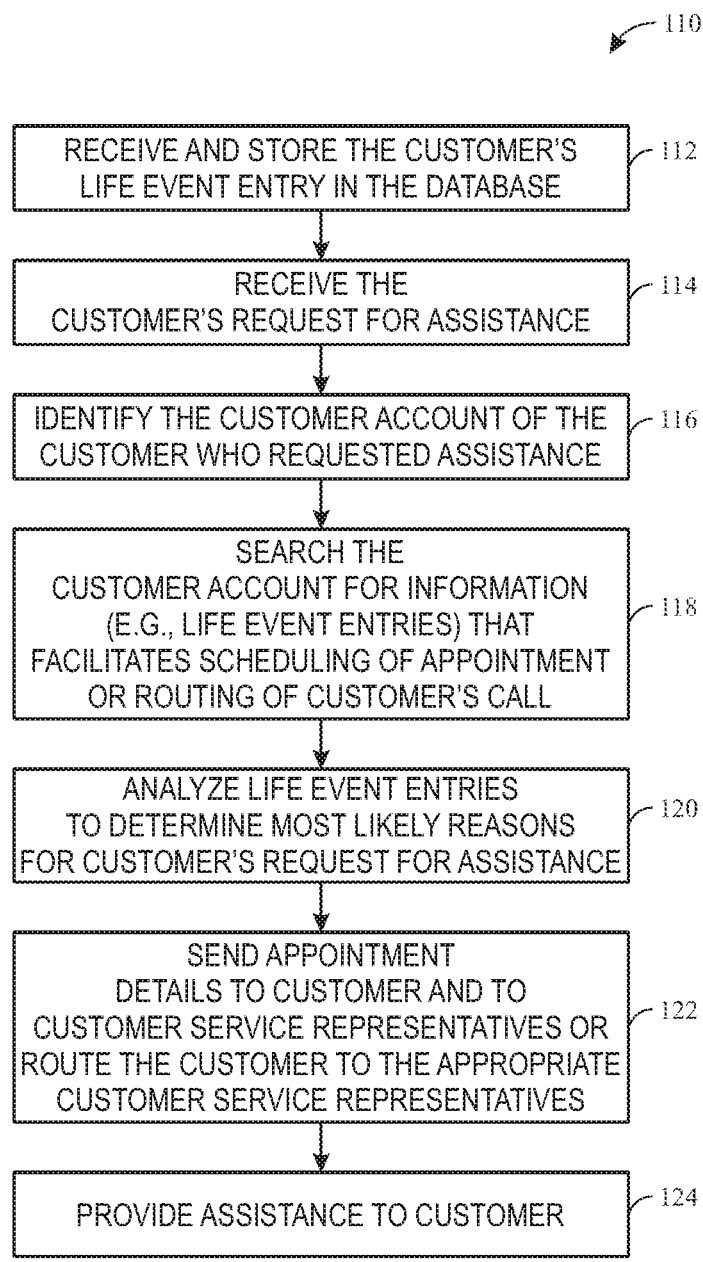

FIG. 4 is a schematic representation of an embodiment of the customer service call center of FIG. 1, in accordance with an aspect of the present disclosure; and FIG. 5 is an embodiment of a process flow diagram illustrating a method of scheduling and conducting a customer service appointment (e.g., customer service teleconference) via the call center of FIG. 4 (e.g., based at least on life events of the customer) in accordance with an aspect of the present disclosure.

DETAILED DESCRIPTION

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Present embodiments are generally directed toward systems and methods for routing customer calls to customer service representatives of a call center. For example, modern businesses often offer a diverse array of services to customers. Further, modern businesses often consolidate customer service support as a cost-saving measure. Unfortunately, traditional consolidated customer service support systems may be cumbersome to navigate for customers. Further, traditional customer service support systems are often inefficient when dealing with personal issues experienced by a particular customer, as opposed to aggregate events (e.g., outages) experienced by many customers at once.

Accordingly, present embodiments are generally directed toward improved systems and methods for routing customer calls to customer service representatives of a call center, and more specifically to improved systems and methods for routing customer calls based at least in part on unique metrics of customer-specific data (e.g., data relating to life events of the customer). For example, a customer may engage a business for various products or services, such as financial services, insurance services, and the like. The business may maintain an account for the customer, where the account includes personal information (e.g., data related to life events) relating to the customer, data relating to the various products or services engaged by the customer, data related to previous customer service calls from the customer, and other information. Further, portions of the customer's account may be accessible by the customer, such that the customer may enter and/or update information in the customer's account. Similar data may also be automatically acquired (e.g., when approved by the customer) via devices, such as smart phones and wearables (e.g., smart watches). Additionally or alternatively, information may be entered into, or received or gathered by, the customer's account automatically or manually (e.g., via third parties such as administrators, banking intuitions, academic institutions, social media accounts, or government institutions). All or a portion of such gathered information may be assembled into a unique metric (which may be referred to as a "data fingerprint" or "digital fingerprint"). This data fingerprint or unique metric may change over time as data is gathered, but may remain associated with the customer and provide guidance with respect to what the customer may desire from a particular business product group or from a customer service call. For example, in accordance with present embodiments, a data fingerprint from a customer's history may guide a call that has been identified as coming from a particular customer (e.g., based on use of the customer's cell phone) and the data fingerprint may be updated based on initial comments made by the customer (or service representative) during the initial portion of the call to better guide the call to an appropriate customer representative within an organization.

As noted above, in accordance with present embodiments, the account (which may be utilized to establish or generate the data fingerprint) may include data or information relating to life events of the customer. For example, the customer may input life event entries into the customer's account, or the customer's account may receive or gather life event entries from other entities or devices, as described above. In other words, the customer may manually enter certain life events, and/or the customer's account may be linked with various agents (e.g., social media accounts, bank accounts, accounts associated with government entities, accounts associated with academic institutions) or devices (e.g., smart phones or wearables) that may automatically send life event entries to the customer's account. "Agents," as used herein, may refer to a source or account of data or information associated with the customer, including an account of the customer and/or a device (e.g., wearable device) of the customer. The customer's account may scrub the various agents linked to the account to retrieve life event data or other customer data. Further, a third party (e.g., an administrator) may manually enter the life event data to the account.

The life event entries, and the customer's account in general, may be saved to a database hosted by servers of the business. Further, the life event entries may encompass a wide range of events, such as financial events (e.g., addition of a new stream of income, addition of a new debt, a raise, a lay-off, purchase of a new home or car), family events (e.g., engagement, marriage, divorce, birth of a new child), medical events (e.g., a recent medial emergency such as a heart attack, a doctor visit, a doctor evaluation, an unusually high heart rate over a prolonged period), educational events (e.g., graduation, enrollment, application), and other types of events. The life events may be sorted or categorized within the customer's account by any suitable sorting characteristic, such as by date of entry, date of event, or type of event (e.g., financial event, family event, medical event, educational event, and the like). Further, the life events alone or in combination with other data (e.g., number and types of accounts) may be assembled into the above-referenced data fingerprint for the relevant customer.

During the course of the customer's interaction with the business and the various products or services offered by the business, the customer may come across an important question, concern, or desired action that the customer is unable to independently address. Accordingly, the customer may contact (e.g., call, text, email or message) a customer service center (e.g., customer service call center) of the business. The customer service call center may be owned and operated by the business, or the customer service call center may be owned and/or operated by a third party that is contracted by the business to provide customer support.

In accordance with embodiments of the present disclosure, the customer service call center may include a switch (e.g., defined as one or more specifically programmed processors), which receives customer contact (e.g., a customer's call) and analyzes the associated unique data or data fingerprint (e.g., assembled life event entries) stored in the customer's account. It should be noted that "switch," as used herein, may encompass several processors and/or memories that work in isolation, or in conjunction, to facilitate routing of the customer call. For example, the "switch" may include processing components that perform analyzation and processing of various inputs, and may include processing or control components that perform the routing of the customer call after performing the analyzation and processing of the various inputs. The switch may also include communicative components configured to receive, or to retrieve, information from the customer account stored to the database on the server(s).

Generally, the switch may analyze the types of life event entries, a date in which the life event occurred, a date in which the life event was entered, a combination thereof, and/or other information related to the life event and/or customer. Depending on the embodiment, the switch may analyze all relevant information, or the switch may analyze only a portion of the available information. Further, depending on the embodiment, the switch may only analyze the information in the customer's account for call routing purposes, or the switch may apply the life event data in the customer's account to aggregate statistical models generated from prior call data.

"Aggregate statistical models" used herein may refer to a statistical model derived from information aggregated from a plurality of customer interactions with a plurality of customers. For example, an aggregate statistical model may predict to which customer service representative to route a particular customer based in part on a routing outcome of similar customers having similar customer inputs as the particular customer. Aggregate statistical models may employ the previously described data fingerprint (or digital fingerprint), but in some embodiments the data fingerprint may be utilized without employing an aggregate statistical model. For example, an embodiment using the data fingerprint without an aggregate statistical model may, instead of comparing a customer's inputs (e.g., data fingerprint encompassing the customer's inputs) with historical call routing outcomes, correspond a particular business operation or service with the customer's inputs (e.g., data fingerprint encompassing the customer's inputs). In other words, e.g., the call routing system may determine that a particular recent life event of the customer (e.g., purchasing a new vehicle) corresponds with a particular service offered by the business in question (e.g., car insurance), and may route the customer to a representative trained to handle the particular service. Additionally or alternatively, customer service representatives may be trained to handle particular life events, as opposed to particular services of the business. Further, as previously described, determinations regarding call routing may be based on several factors, including but not limited to the life events of the customer, the chronological proximity between the life event(s) and the customer contact, and other factors, as described in detail below.

Based on the switch's analysis of the relevant life event information (and, in some embodiments, how the relevant life event information relates to aggregate statistical models mapping prior call data and corresponding routing results), the switch may automatically route the caller to a customer service representative equipped to handle the caller. In other words, the switch may route the caller to an appropriate customer service representative without the customer ever having to explain a reason for the call (or after confirming with the customer that the switch's analysis and determination of the relevant information and reason for the call is accurate). Accordingly, the customer may be paired with the customer service representative more quickly than traditional embodiments that require more substantial interaction between the customer and, for example, an automated system that queries the customer and receives voice or digital input from the customer to determine a purpose of the call.

To further facilitate the processes in accordance with the present disclosure, as previously described, customer service representatives may be trained to handle one or more particular life events, as opposed to one or more particular actions that may be applicable to a number of life events. To guide callers to these representatives, the representatives may be assigned by the switch to relevant categories detectable within a data fingerprint. For example, instead of routing a customer that recently graduated high school to a college loan customer service representative based on a likelihood that the customer desires to take out a student loan, the call center may route the customer to a customer service representative trained to assist recent high school graduates and/or prospective college students. Accordingly, the business or call center may train the customer service representative to handle any issue or action that may be required relative to one or more particular life events (which may or may not include training the representative how to open the bank account for the customer, depending on whether opening the bank account for the customer is encompassed in the one or more particular life events the representative is trained to handle). Thus, instead of querying the customer about a particular action sought by the customer (which is limited by the customer's understanding of the business), the switch may automatically route the customer to the appropriate customer service representative after identifying relevant life event entries (e.g., as discerned from the data fingerprint) associated with the customer's call. Thus, the switch may rely mostly on reliable information already stored in the customer's account, as opposed to the customer's dictation of actions sought by the customer (which are limited not only by the customer's understanding of the business, as described above, but also, in many embodiments, by technical limitations [e.g., voice recognition software] of automated systems). Present embodiments may enhance capabilities of traditional techniques (e.g., voice recognition techniques) by making such techniques more accurately and efficiently able to direct calls than the traditional techniques are capable of doing alone. These and other features, in accordance with present embodiments, will be described in detail below with reference to later figures.

FIG. 1 is a schematic representation of an embodiment of a system 10 having a call center 11 owned and/or operated by a business. In the illustrated embodiment, the call center 11 includes a database 12 configured to store a variety of information (e.g., life event data and/or other client data). For example, the database 12 may be hosted on servers 13 owned and/or operated by the business. A customer 14 of the business may open or update a customer account (e.g., managed by the business) that is stored on the servers 13 and in the database 12. For example, the servers 13 may be communicatively coupled to a network 15, and the customer 14 may access the servers 13 (and the database 12 thereof) by communicating over the network 15. The customer 14 may utilize a device (e.g., a smart phone, a computing device, a laptop, or some other customer interface device [CID]) communicatively coupled to the network 15 to open or update the customer account by accessing a website owned or operated by the business, where the website is hosted by the servers 13 and is configured to enable entry of customer account information to be stored in the database 12. In some embodiments, the customer account of the customer 14 is accessible by way of the website. It should be noted that the illustration of the customer 14 in FIG. 1 is intended to include representation of the device by which the customer 14 is able to access the network 15.

In some embodiments, the business may automatically enter information to (or register/open) the customer account of the customer 14. Further, the customer 14 and/or other agents 16 (e.g., wearable devices, accounts associated with government entities, social media accounts, accounts associated with banking institutions, accounts associated with academic institutions) may enter information to the customer account. For example, the customer account may receive, from the customer 14 or the other agents 16, information relating to demographics (e.g., age, race, and ethnicity) of the customer 14. Further, the customer account may receive information relating to life events of the customer 14. More specifically, the life event entries may include information relating to financial events (e.g., addition of a new stream of income, addition of a new debt, a raise, a lay-off), family events (e.g., engagement, marriage, divorce, birth of a new child), medical events (e.g., a recent medial emergency such as a heart attack, a doctor visit, a doctor evaluation), educational events (e.g., graduation, enrollment, application), and other information or events.

As previously described, the customer account stored to the database 12 may receive information manually entered by the customer 14 (or by a third party, such as an administrator). However, the customer account may receive life event data a number of other ways. For example, the customer account saved to the database 12 (e.g., stored on the servers 13) may be linked (e.g., with permission from the customer 14, depending on the embodiment) to various other agents 16 (e.g., social media accounts, bank accounts, government entity accounts, academic institution accounts). In some embodiments, the customer 14 may provide (e.g., authorize) the business access to the other agents 16 of the customer 14. The other agents 16 may automatically send life event entries (and/or associated data) to the servers 13 (and the database 12 thereof) by accessing the servers 13 via the network 15. Additionally or alternatively, the servers 13 (or database 12 thereof) may automatically retrieve, via the network 15, the life event entries from the other agents 16 (e.g., via software capable of identifying life events within the other agents 16, such as a program capable of scanning a social media account to determine life events).

For example, social media accounts may automatically send to the servers 13 (or the servers 13 may automatically retrieve from the social media accounts) relationship status updates (e.g., engagement or marriage), such that the relationship status updates are stored to the database 12 hosted by the servers 13 (e.g., in the customer account of the customer 14). As described above, the servers 13 (or some other component of the system 10) may scrub or scan the other agents 16 linked to the customer account for life event information. For example, a text recognition software of the system 10 or call center 11 (e.g., software stored on the servers 13) may scan or scrub the other agents 16 for relevant information, and store the relevant information to the customer account in the database 12 hosted by the servers 13. Further, wearable devices may be worn by the customer and may automatically send data over the network 15 to the database 12 on the servers 13. The wearable devices may be medical devices that monitor vitals of the customer 14 and send data related to the customer's 14 vitals to the database 12. Further still, call data (e.g., data acquired from free text analysis of a call) may also be acquired during previous or real-time calls and added to the database 12. For example, an initial verbal communication from the customer may include "I recently got married." Free text analysis may identify "married" from this communication and use that term to facilitate routing the call while also incorporating its use into the customer's data fingerprint.

During the customer's engagement with the business, the customer 14 may come across a question, a concern, or an action of which the customer 14 seeks assistance. Accordingly, the customer 14 may contact the call center 11 by accessing the network 15 (or some other network). For example, the customer 14 may utilize a telecommunication device such as a cell phone to call the call center 11. In other embodiments, the customer 14 may utilize a telecommunication device such as a computing device or laptop to email or message the call center 11. Accordingly, "call center" used herein refers to any center in accordance with present embodiments configured to receive a message (e.g., a phone call, a text, an email, or a chat message).

In the present embodiment, the customer's call may be received (or otherwise managed) by a switch 18 of the call center 11. The switch 18 may include one or more processors 20 (e.g., processing circuitry) and one or more memory 22 (e.g., memory circuitry). A program may be stored in the memory 22, where the program includes a set of instructions that, when executed by the processor 20, cause the switch 18 to carry out certain functions. Upon the processor's execution of at least a portion of the program saved in the memory 22, the switch 18 may verify an identity of the customer 14. For example, the switch 18, which is communicatively coupled to the network 15 over which the customer 14 contacts the switch 18, may access the servers 13 via the network 15 to search the database 12 for a customer account associated with the phone number of the customer's phone call. After locating the customer account associated with the phone number of the customer's phone call (e.g., by matching the phone number of the customer's phone call with the phone number listed in the customer's account), the switch 18 may verify the customer's identity automatically, or the switch 18 may prompt (e.g., via an automated voice) the customer 14 for additional identification verification. In some embodiments, the switch 18 may prompt the customer 14 for identification verification even if the phone number of the customer's call is not located in any customer accounts saved in the database 12. For example, the switch 18 may ask the customer 14 for the customer's social security number, account number (e.g., of the customer account), or other identification verification questions. Further, in some embodiments, the switch 18 may search for other relevant information in the customer's account and not the customer's phone number.

After verifying the identity of the customer 14, the switch 18 may access the customer's account in the database 12. For example, the switch 18 may access life event entries saved to the customer's account, or the customer's data fingerprint encompassing his or her life event entries. As previously described, the life event entries may be sorted in the customer's account in such a way that the switch 18 considers the most relevant life events first. For example, depending on the embodiment, the life event entries may be sorted in the customer's account by date of entry, date of occurrence, relevance to the products or services engaged by the particular customer 14, or any other relevant sorting technique. By sorting or categorizing the customer's life event entries (e.g., prior to receiving the customer 14 contacting the call center 11), processing time during the customer's call may be reduced.

Based on the customer's unique data (data fingerprint) or life event entries stored to the customer's account in the database 12, the switch 18 may automatically determine a most likely life event (and/or corresponding issue) associated with the customer's 14 call. For example, in some embodiments, the switch 18 may determine that, based on a temporal proximity between the call and the date of entry for one or more life events, the customer 14 is at least likely to be calling about an issue (e.g., a particular product or service) associated with the data fingerprint or one or more life event entries. In some embodiments, the switch 18 may optionally query the customer 14 regarding whether the determined life event and/or associated category for service (and/or, in some embodiments, associated issue) for the call is accurate.

After considering the life event entries, the switch 18 may place the customer 14 in a queue via a queue manager 23. For example, the switch 18 may determine that all qualified representatives capable of handling the customer's 14 issue are unavailable. Thus, the switch 18 may place the customer 14 in the queue stored on the queue manager 23 of the switch 18. Once a qualified representative becomes available (e.g., a representative trained to handle services encompassing one or more identified relevant life events, or a representative trained to handle the one or more identified relevant life events directly), the switch 18 may route the customer 14 accordingly. As previously noted, the switch may categorize representatives based on their familiarity with certain life events, or based on life event based issues/services.

As described above, the switch 18 may route the customer 14 to a customer service representative (e.g., representative 24, 26, 28, 30) that is equipped (e.g., trained) to handle the customer's call. Each customer service representative 24, 26, 28 may be trained to handle, for example, one or more categories (e.g., types) of life event entries. For example, the customer service representative 24 may be equipped (e.g., trained) to handle calls regarding financial events or specific subcategories thereof. The customer service representative 26 may be equipped (e.g., trained) to handle calls regarding medical events or specific subcategories thereof. The customer service representative 28 may be equipped (e.g., trained) to handle calls regarding family events or specific subcategories thereof. Any number of representatives may exist, each representative being equipped to handle one or more types of calls. For example, other representatives 30 may be equipped to handle any other life events entries in accordance with the present disclosure. In certain embodiments, each representative 24, 26, 28, 30 may be equipped (e.g., trained) to handle issues associated with one or more particular categories (e.g., types) of life event entries.

It should be noted that the representatives 24, 26, 28, 30 may be digital representatives. For example, each representative 24, 26, 28, 30 may be a digital representative programmed to handle certain types of life events. In some embodiments including digital representatives, the digital representatives may include (or be coupled with) a machine learning component (e.g., processor and memory). The machine learning component may at least partially form, or facilitate, generation of (and updates to) history-based aggregate statistical models described in detail below. In other embodiments, however, the digital representatives may not employ, and/or may not generate/update the history-based aggregate statistical models.

By training representatives 24, 26, 28, 30 to handle particular types of life events (and/or by having digital representatives programmed to assist with certain types of identified life events), in conjunction with identifying life event entries associated with the customer's 14 call, the call center 11 may route the customer's 14 call with reduced (or no) interaction between the customer 14 and, for example, an automated voice system. In other words, the switch 18 may be capable of routing the customer's 14 call more quickly and more efficiently, in some embodiments with little or no input (e.g., during the call and prior to call routing) from the customer 14, because the switch 18 only needs to identify relevant life events in the data fingerprint of the customer 14, and then route the customer 14 to the representative capable of handling the relevant life event (e.g., any of the services relating to the relevant life events). Accordingly, technical limitations of automated voice systems (e.g., voice recognition software) may be avoided, and a required processing power of the switch 18 is reduced. However, in some embodiments, the representatives 24, 26, 28, 30 may each be trained to handle a particular subset of services, and the switch 18 determines the most appropriate of the representatives 24, 26, 28, 30 to handle the life event(s) at issue. For example, the switch 18 may identify that the customer 14 recently got married, may correlate getting married with taking out a mortgage, and may transfer the customer 14 to whichever of the representatives 24, 26, 28, 30 is trained to handle mortgages. These and other features will be described in detail below with reference to process flow diagrams.

Figure 2:
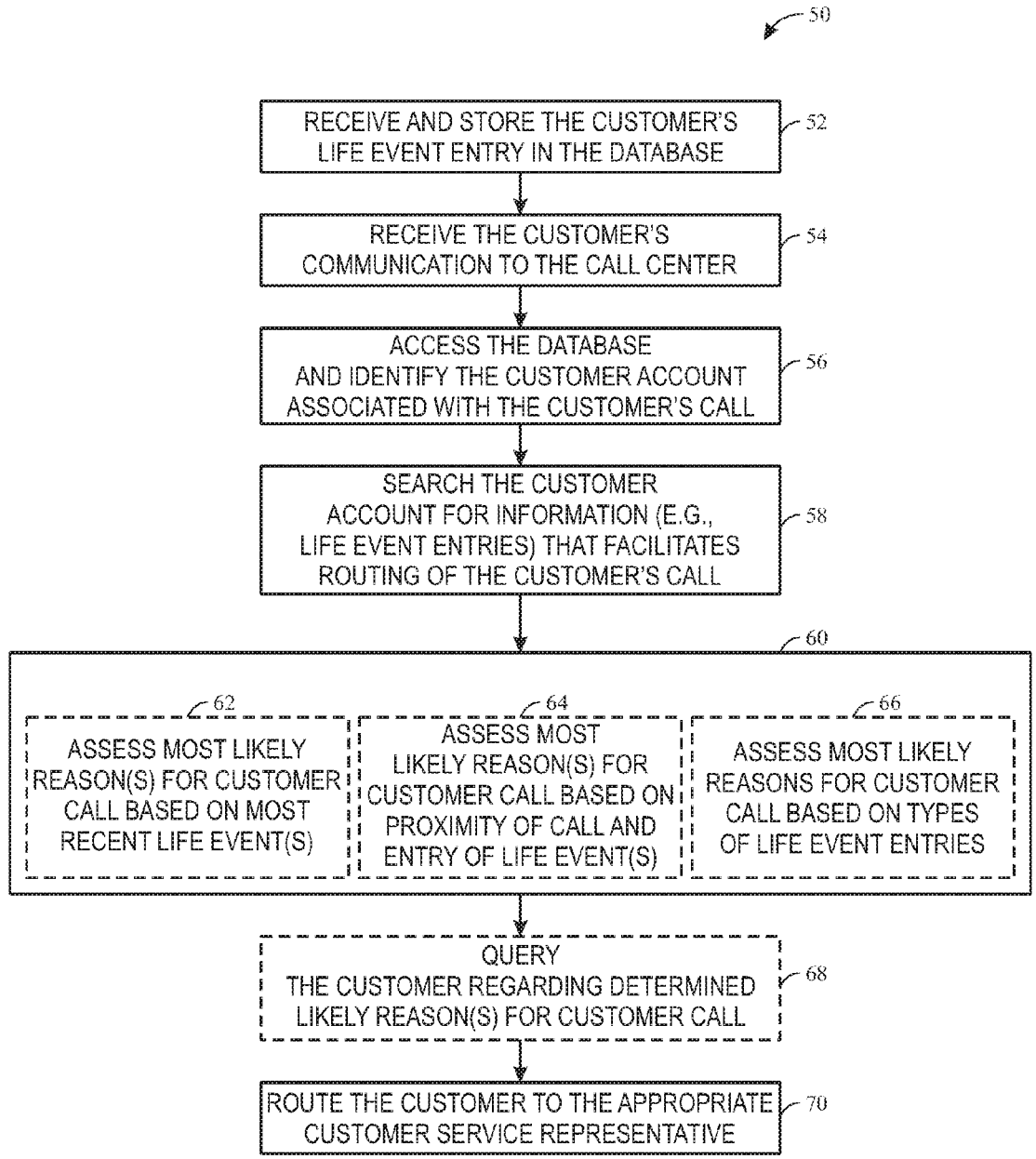
FIG. 2 is an embodiment of a process flow diagram illustrating a method of routing a customer call through the call center of FIG. 1 (e.g., based on life events of the customer), in accordance with an aspect of the present disclosure.

FIG. 2 is an embodiment of a process flow diagram illustrating a method 50 of routing a customer call through the call center 11 of FIG. 1 (e.g., based at least partially on life event entries of the customer). The method 50 includes receiving and storing (block 52), via the database, the customer's life event entries. For example, as previously described, the database may automatically receive life events associated with the customer, the customer may manually input life event entries to the database, the business that owns and/or operates the database may input life event entries to the database, and/or life event entries may be reacquired by (e.g., received by, sent to, or retrieved by) the database from devices and/or other agents or third parties. The life event entries may relate to financial events (e.g., addition of a new stream of income, addition of a new debt, a raise, a lay-off), family events (e.g., engagement, marriage, divorce, birth of a new child), medical events (e.g., a recent medial emergency such as a heart attack, a doctor visit, a doctor evaluation), educational events (e.g., graduation, enrollment, application), and other information or suitable events relating to the customer's life. The database may store the life event entry or entries and may sort the entry or entries by date (e.g., date of entry or date of event), life event category (e.g., type), or any other suitable sorting means.

The method 50 also includes receiving (block 54) a communication from the customer to the call center. For example, the customer may come across a question, concern, or required action of which the customer seeks assistance. The customer may communicate with (e.g., call, email, or message) the call center to seek such assistance.

The call center may include the switch, which receives the customer's call and facilitates queueing and/or routing of the customer's call.

For example, the switch may include the processor and the memory, as previously described. Instructions may be stored on the memory that, when executed by the processor, cause the switch to perform various functions. Upon execution of the instructions by the processor, the switch may access the database (via the network communicatively coupled to the servers on which the database is stored) and search/access (block 56) the database for the customer's account. The switch may then locate the customer's account, for example, by searching the database for the relevant phone number (or other telecommunication identifier, such as email address) associated with the customer's call and saved to the customer's account. This may include extracting information from the customer's data fingerprint. If the switch fails to determine the appropriate customer account associated with the customer's call, or if additional identification verification is required or desired, the switch may query the customer (e.g., via automated messaging and voice recognition software) for relevant identification verification information. For example, the switch may request verification of the customer's social security number, an account number, and/or other personal information that facilitates identification verification.

After identifying the appropriate customer account associated with the customer's call, the switch may search (block 58) the customer's account for information (e.g., life event entries and related information) that facilitates routing of the customer's call. This may include extracting such information from the customer's data fingerprint. For example, the instructions executed by the processor may cause the switch to scan the customer's account for life event entries entered to the customer account within a particular time period. However, in some embodiments, the switch may be configured or calibrated to proceed based on a score or value of the overall data fingerprint. It should be noted that, in some embodiments, the switch may determine how to route the customer's call based on a comprehensive review of the customer's digital fingerprint. For example, while the switch may route the customer's call by determining the most relevant life events from a subset of life events as previously described, the switch may additionally or alternatively analyze all or a subset of the life events associated with the customer and, for example, assess a weight to each of the analyzed life events to calculate a comprehensive score associated with the customer's data fingerprint. The customer's call may be routed based on the comprehensive score.

After locating the life event entries within the customer account, the switch may determine (block 60) which life events are associated (or likely associated) with the customer's call. Determining which life events are associated with the customer's call may include one or more of blocks 62, 64, and 66. For example, the switch may assess (block 62) a most likely life event (and/or corresponding issues) associated with the customer's call based on the most recent life event(s) saved to the customer's account (e.g., by date on which the life event occurred). In other words, the switch may determine the most recent life event(s), and determine (e.g., based on a temporal proximity between the call and the life event[s]) which life event(s) are most likely associated with the customer's call. By way of non-limiting example, the switch may determine that the customer got married recently (e.g., within one week or one month of the customer's call to the call center), and may determine that the call is most likely associated with the customer's recent marriage and related issues.

Additionally or alternatively, the switch may assess (block 64) the most likely life event (and/or corresponding reason) for the customer's call based on the temporal proximity between the customer's call and the date on which the life event(s) are entered to the customer account. For example, the switch may determine that a particular life event entry (e.g., recent marriage) was entered by the customer to the customer's account on the same day of the customer's call to the call center. Accordingly, the switch may determine that the call is most likely associated with the customer's entry of his or her recent marriage.

Additionally or alternatively, the switch may assess (block 66) the most likely reason for the customer's call based on the type or category of life event entries to the customer's account. For example, the switch may determine that a particular life event entry is likely to require (or be assisted by) some action on the part of the business (e.g., which may be handled by the customer service representatives). By way of non-limiting example, the switch may determine that the customer opted-in to using a new product or service offered by the business, where the new product or service requires (or is facilitated by) certain registration information that is not already saved to the customer's account. Accordingly, the switch may determine that the call is most likely associated with the customer's life event entry (e.g., use of a new product or service) that may require (or be assisted by) some action on the part of the business. Additionally or alternatively, the switch may correlate types of life event entries with seasonal needs to determine a most likely reason for the call. For example, the switch may identify that the customer is currently enrolled in school (e.g., by analyzing an "academic life event" entry saved in the customer's account), that a particular semester of school is about to begin or just began, and, thus, that the customer is most likely calling about the academic life event. Determining the most likely relevant life events may include employing control logic that compares identified life event entries with one another. Additionally or alternatively, determining the most likely relevant life events may include scoring each of the identified life event entries based on the factors described above, including date of entry of the life event (block 64), date of occurrence of the life event (block 62), and type of the life event (block 66)

After determining which life events are likely associated with the customer's call (and, in some embodiments, an issue or reason for the call associated with the relevant life event[s]), the switch may optionally query (block 68) the customer regarding the determined relevant life event(s) and associated reason(s) for the customer's call. For example, the switch may prompt the customer to provide a 'yes' or 'no' answer whether the determination(s) of the switch in accordance with the method 50 are accurate or inaccurate. In some embodiments, the switch may analyze a multitude of life events within the customer's account, and determine a likelihood that each life event is relevant to the customer's call. The switch may propose the most likely determination (e.g., having the highest probability score) first, the second most likely determination (e.g., having the second highest probability score) second, the third most likely determination (e.g., having the third highest probability score) third, and so on and so forth. In some embodiments, the switch may only query the customer regarding a certain number of switch determinations (e.g., one determination, two determinations, three determinations, five determinations, or more determinations) before the switch routes the customer to a general customer service representative for further assistance, or before the switch activates some other call routing method to determine a reason for the customer's call. Probability scores may be weighted based on data indicating what has traditionally been of high importance to the specific customer (e.g., a higher score may be assigned to medical issues than investment issues based on historical interactions with the particular customer).

Regardless of whether the querying step (block 68) is included in the method 50, the switch may route (block 70) the customer to the appropriate customer service representative in accordance with the determinations made by the switch described above (e.g., determinations regarding the life event[s] associated with the customer's call and/or the potential or likely reason[s] for calling that correspond with the life event[s] associated with the customer's call). For example, as previously described, each customer service representative may be trained to handle calls corresponding with one or more particular categories of life events (e.g., family events, financial events, academic events). Based on the determinations made by the switch, the switch may route the customer's call to the appropriate customer service representative. In some embodiments, the customer service representative may be trained to handle a particular service offered by the business, and the life event(s) relevant to the customer's call may correspond with said particular service.

It should be noted that, in the illustrated embodiment, determining (block 60) which life events are associated (or likely associated) with the customer's call may or may not include comparison with historical data or historical (e.g., aggregate) statistical models developed via analysis of previous customer calls and corresponding routing results. In other words, traditional call routing systems may develop or implement aggregate statistical models that facilitate application of historical data from a wide range of interactions with numerous individuals (e.g., to a set of parameters associated with a current customer's call) in determining a reason for the customer's call. However, in accordance with the present disclosure, the method 50 is capable of, although does not necessarily require, routing a customer's call without developing or implementing such history-based (e.g., aggregate) statistical models. For example, the method 50 may route the customer's call based mostly or entirely on the life event entries (and corresponding information, such as date of entry, date of event, etc.) saved to the customer's account and/or on the date on which the customer calls (or communicates with) the call center. Further, while aggregate statistical models may be used, in some embodiments, the aggregate statistical model may be based entirely on interactions with the particular guest, which provides more customization for a particular user than traditional systems (e.g., the aggregate statistical model only aggregates, for example, historical call routing inputs and results from a history of the particular customer).

In general, historical (e.g., aggregate) statistical models developed based on historical call data are suitable for aggregate issues experienced by many customers at once (e.g., outages), but are less suited for personal issues experienced by an individual customer. In other words, it is presently recognized that historical (e.g., aggregate) statistical models may be suitable for handling outages that affect many customers, but may be less suited for handling a call from a customer related to, for example, the customer's new marriage. Accordingly, by accessing, for example, the customer's marriage information (e.g., date of marriage) from the customer's account, the switch may determine that the customer is most likely to be calling about the customer's recent marriage.

It should also be noted that the above-described method 50 facilitates faster processing times of customer communications (e.g., customer calls) to the call center. For example, the method 50 may enable a customer to be routed to the appropriate customer service representative without ever having to interact with an automated voice messaging system, or with reduced interaction with the automated voice messaging system. The customer may call the call center, and the switch may automatically identify the customer's account, search the customer's account for relevant life event entries, determine a likely reason for the call based on the life event entries, and route the customer to the appropriate customer service representative based on the determined likely reason for the call. However, in some embodiments, the switch may include an automated system that requests that the customer confirm findings made by the switch. For example, the switch may instruct the automated system to request confirmation from the customer that the switch's findings (e.g., that a recent life event of the customer is the reason for the customer's call) are accurate.

As previously described, to facilitate the method 50, customer service representatives may be trained to handle one or more particular life events (e.g., family events, income events, medical events, academic events, or some other event[s]), as opposed to one or more particular products, and/or as opposed to or one or more particular actions associated with the one or more particular products (e.g., money transfer, registration, outages). The determined likely life event (and corresponding likely issue[s]) associated with the customer's call may be correlated with the appropriate customer service representative, who is trained to handle the determined likely life event (and all the products that may involve the determined life event). Thus, instead of routing calls by sought products or actions (e.g., a first product or a first product registration of the first product) that may apply to many life events (e.g., a new marriage [joint bank account registration], a new raise [investment account registration], a new born baby [529 plan registration]), the switch may route calls to customer service representatives based on life events. The customer service representatives are trained to handle the determined life event (e.g., all products or actions/issues associated with the determined life event), and thus may be capable of assisting the customer with any question, concern, or action associated with the determined life event or corresponding product(s).

Further still, it should be noted that the customer's call and the switch's determination of factors (e.g., reasons for calling) associated with the call may apply to any life event entries in accordance with the present disclosure. For example, the switch may determine, based on the customer's account, that the customer is calling regarding a family event, a medical event, an income event, an academic event, or any other event in accordance with the present disclosure. As previously described, the switch may consider the time of the life event, the time of entry of the life event, the types of life events listed in the customer's account and their relative importance or likelihood of requiring assistance, and/or other factors.

Figure 3:
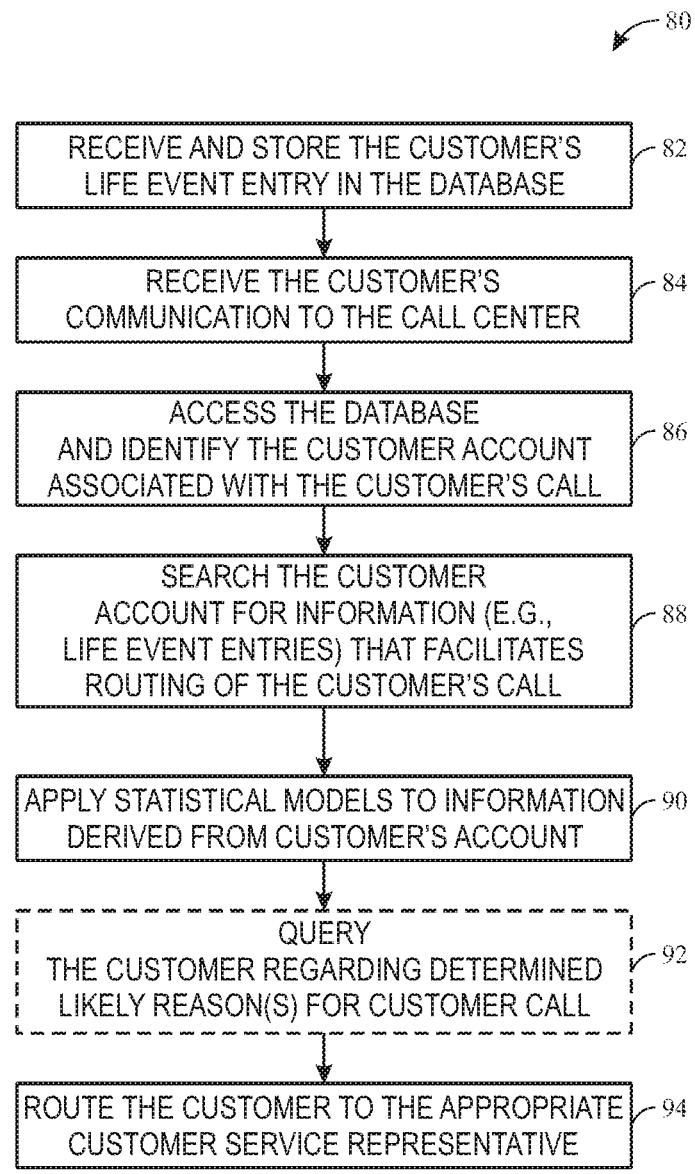
FIG. 3 is another embodiment of a process flow diagram illustrating a method of routing a customer call through the call center of FIG. 1 (e.g., based on life events of the customer and aggregate statistical models implemented by the call center), in accordance with an aspect of the present disclosure.

FIG. 3 is an embodiment of a process flow diagram illustrating a method 80 of routing a customer call through the call center 11 of FIG. 1 (e.g., based on life events of the customer and aggregate statistical models developed and/or implemented by the call center 11). In the illustrated embodiment, blocks 82, 84, 86, and 88 substantially correspond with blocks 52, 54, 56, and 56, respectively, in FIG. 2. For example, the database receives and stores (block 82) the customer's life event entry or entries in the database. The call center (e.g., the switch of the call center) receives (block 84) the customer's communication to the call center. The switch accesses and identifies (block 86) the customer account associated with the customer's call or other communication. The switch searches (block 88) the customer's account for information (e.g., life event entry information) that facilitates routing of the customer's call.

After determining relevant information (e.g., relevant life event entries and corresponding issues) that may be associated with the customer's call, the switch may input or apply (block 90) the information to aggregate statistical models to determine a likelihood of the call. For example, over time, the system (e.g., system 10 in FIG. 1) or call center (e.g., call center 11 in FIG. 1) thereof may gather records or data associated with customer calls, in addition to corresponding routing results. The aggregate statistical models may be based on multiple customer interactions or individualized customer interactions. For each customer call, once the appropriate customer service representative is determined, the system may log the appropriate customer service representative and correlate the logged appropriate customer service representative with life event data stored in the customer's or customers' account. The correlated data may be entered into an algorithm (or algorithms) that generate(s) the aggregate statistical models which facilitate routing of future calls, as described in detail below. Each aggregate statistical model may represent a reason for the customer's call (e.g., to discuss a particular life event and/or corresponding issue) or a corresponding accurate route for the customer's call (e.g., to a particular customer service representative trained to handle the reason for the customer's call). After applying available parameters (e.g., life events and associated data from the customer's account) to each aggregate statistical model, a probability score for each aggregate statistical model may be generated based on the likelihood that the customer is calling regarding the particular life event or life events (or corresponding call routing path[s]) encompassed by the aggregate statistical model.

To generate probability scores for the aggregate statistical models, as described above, any suitable information relating to the customer's life event entries (e.g., type or category, date of life event, date of entry) may be used. Further, after determining the desired call routing channel, the results may be entered into algorithm(s) that generate and/or update the statistical models. In some embodiments, inaccurate routing of customer calls may also be entered into a portion of the algorithm(s) that receives inaccurate routing information. Over time, a wealth of data relating to numerous customer calls may be entered into the algorithm(s). As the algorithm(s) become(s) more and more populated with more and more data points, the algorithm(s) (and corresponding aggregate statistical models generated by the algorithm[s]) may become more accurate. As described above, the algorithm may generate, or facilitate generation of, the aggregate statistical models associated with life events and/or appropriate call routing. Thus, each aggregate statistical model generated by the algorithm(s) may represent a particular channel (or representative) to which to route the customer's call. For example, one aggregate statistical model may represent routing the call to a 'family event' customer service representative. Another aggregate statistical model may represent routing the call to an 'academic event' customer service representative. Still another aggregate statistical model may represent routing the call to an 'income event.' Each aggregate statistical model may be considered in view of the available parameters (e.g., life event data) in the customer's account, and assigned a probability score that represents a 'percent likelihood' that the customer is calling about the life event (and corresponding call routing channel) associated with the aggregate statistical model. Further, specific account representatives may be associated with specific customers because of a relationship that has developed over multiple calls.

In some embodiments, the switch (or other processors may input or apply life event data to every available aggregate statistical model, and calculate a probability score for every available aggregate statistical model. The method 80 may optionally include querying (block 92) the customer regarding whether the call routing channel corresponding with the aggregate statistical model having the highest probability score is accurate. Because the switch may assign a probability score for each available aggregate statistical model, the method 80 may include querying the customer regarding each model (starting with the highest probability score, then the second highest probability score, then the third highest probability score, and so on and so forth) until the customer answers affirmatively. In some embodiments, the switch may only input or apply the life event data to the aggregate statistical models until the switch locates an aggregate statistical model that generates a probability score higher than a particular threshold probability score. For example, if the percent likelihood of a particular aggregate statistical model is over a particular threshold probability score (e.g., greater than 50%, 60%, 70%, 75%, 80%, 85%, or 90%), the switch may automatically route the caller to a customer service representative capable of handling the life event (e.g., family event) associated with the particular aggregate statistical model, or the switch may automatically query the customer regarding whether the planned call routing channel (e.g., associated with the relevant aggregate statistical model) is accurate. However, in some embodiments, aggregate statistical models may be applied to each and every life event stored to the customer's account, or to each and every life event stored to the customer's account over a particular time period, or to each and every life event stored to the customer's account within a certain group of life event types or categories, as described above. After determining, based on application of the life event data to the aggregate statistical models, which life event is most likely the reason for the customer's call, the switch may route (block 94) the customer's call accordingly.

FIG. 4 is a schematic representation of an embodiment of the system 10 having the call center 11 of FIG. 1. In the illustrated embodiment, the call center 11 includes the switch 18, the servers 13 that host the database 12, and the various customer service representatives 24, 26, 28, 30 (or corresponding communication lines of the various customer service representatives 24, 26, 28, 30) from FIG. 1. However, in the illustrated embodiment, the call center 11 also includes a teleconference host 100, which may be owned by the business that owns, operates, or utilizes the call center 11 for customer service support, or which may be owned by a third party contracted by the business that owns, operates, or utilizes the call center 11 for customer service support.

In accordance with the present disclosure, the illustrated call center 11 may function similarly, at least in part, to the call center 11 illustrated in FIG. 1. For example, the switch 18 (via the network 15) may receive a call or communication (e.g., message, email, or text) from the customer 14 (via the network 15) and access and search (via the network 15) the database 12 (hosted by the servers 13) for the account of the customer 14. The customer account may include life event information, as previously described, and the switch 18 may analyze the life event information to determine a likely life event or corresponding issue associated with the customer's call.

In accordance with the present embodiment, the contact or communication received by the switch 18 from the customer 14 may be a phone call, an email, a message, or the like. For example, the customer 14 may send a message to the switch 18 requesting assistance. The message may include detailed information regarding the assistance required or desired by the customer 14 (e.g., life event entries), or the message may simply include a request for assistance. In some embodiments, the message may also include a requested time (e.g., requested by the customer 14) to discuss the request for assistance with qualified customer service representatives. The switch 18 may analyze the message and/or the life event data saved to the customer's account in the database 12 to determine a likely life event or corresponding reason associated with the customer's request for assistance. In some embodiments, the customer's request for assistance may be accompanied by the customer's indication that one or more life events (and/or corresponding issues associated with the one or more life events) are relevant to the request for assistance. The switch 18 may analyze the life events included in the customer's request for assistance, regardless of whether the life events included in the customer's request for assistance are included in the customer's account. Further, the switch 18 may add the life events to the customer's account The switch 18 may then message the customer 14 with a customer service appointment. For example, the switch 18 may message the customer 14 with a teleconference number and a time and date to call the teleconference number. The switch 18 may also message one or more customer service representatives the customer service appointment details. For example, in some embodiments, the switch 18 may determine, or the customer 14 may request, assistance that may require the help of multiple representatives. Additionally or alternatively, the life event and/or corresponding issue for which the customer 14 seeks assistance may be ambiguous or unclear. Accordingly, the switch 18 may identify multiple potential likely life events (and/or corresponding issues) that may be associated with the request for assistance, and the switch 18 may message the appointment details to multiple customer service representatives (e.g., customer service representative 24 and customer service representative 26). Each representative 24, 26 may be trained to handle one or more of the multiple potential likely life events (and/or corresponding issues). Accordingly, all of the potential likely life events associated with the customer's call (e.g., as determined by the switch 18) may be addressed.

After the customer 14 and the customer service representatives (e.g., representative 24 and representative 26) receive the appointment details, the customer 14 and the customer service representatives (e.g., representative 24 and representative 26) may access a communication line or portal to discuss the customer's request for assistance. For example, in the illustrated embodiment, the customer 14 and the representatives 24, 26 may phone into the teleconference host 100 (e.g., via the network 15 or another network) to discuss the request for assistance. In other embodiments, the customer 14 and the representatives 24, 26 may access an online messaging system (e.g., via the network 15 or another network) or some other communication means to discuss the request for assistance. If, during the meeting, it becomes clear that one or more of the representatives (e.g., representative 24 or representative 26) is not needed, the representative (e.g., representative 24 or representative 26) may leave the teleconference or communication means utilized for the appointment.

It should be noted that the embodiment illustrated in FIG. 4 is also configured to handle situations where the customer 14 phones into the call center 11 (e.g., where the call is received by the switch 18) and remains on-line. In such embodiments, appointment details may be communicated to the customer 14 and to appropriate representatives (e.g., representatives 24 and 26) as described above for an appointment at a later time and/or date, or the customer 14 may be automatically connected with the appropriate representatives. Further, it should be noted that, in some embodiments, the teleconference (e.g., with multiple representatives) option may be a premium service requiring payment by the customer 14. For example, the teleconference option may be a premium service included for such products as financial advisement. Accordingly, the customer 14 may be required to make payment before, during, or after the customer's initial communication to the customer service or call center 11.

FIG. 5 is an embodiment of a process flow diagram illustrating a method 110 of scheduling and/or conducting a teleconference via the call center 11 of FIG. 4, based at least in part on life events of the customer. In the illustrated embodiment, the method 110 includes receiving and storing (block 112) the customer's life event entry or entries in the database, similar to blocks 52 and 82 in FIGS. 2 and 3, respectively. The method 110 also includes receiving (block 114) the customer's request for assistance. As previously described, the customer may call the call center to provide the request for assistance, or the customer may send an email or message (e.g., online message) to the call center or customer service center requesting assistance. The request for assistance may include details such as relevant life events and corresponding issues associated with the relevant life events, or the request for assistance may simply indicate to the call center or customer service center that the customer seeks assistance. In some embodiments, the relevant life event information included in the request for assistance may not already be entered to the customer's account. Accordingly, the new relevant life event information may be entered to the customer's account following location and verification of the customer's account, in accordance with the description below.

The method 110 also includes identifying (block 116) the customer account associated with the request for assistance and corresponding customer. As previously described, the switch of the call center may access the database (e.g., by accessing the servers via the network) to search for the customer's account. For example, the switch may search for a match between information included in the request for assistance (e.g., account number, phone number, social security number) and information included in a customer account saved to the database. After determining a match, the switch may confirm that the customer account is associated with the customer seeking assistance, or the switch may request verification from the customer (e.g., by asking security question, as previously described).

The method 110 also includes searching (block 118) the customer account for information (e.g., life event entries or related information) that facilitates scheduling of the customer service appointment with one or more appropriate customer service representative(s) (or routing the customer's call to the appropriate customer service representative[s], in embodiments where the customer requests assistance in real time over the phone). For example, the switch may locate life events saved to the customer's account. This may include extracting such events from a data fingerprint. The life events may be sorted (e.g., by type, date of event, or date of entry) in the customer's account prior to the switch accessing the customer's account, thereby reducing processing time following a customer's request for assistance, as previously described.

Further, the method 110 includes analyzing (block 120) the life event entries to determine the most likely life events associated with the customer's request for assistance, and/or most likely corresponding issue(s) (e.g., associated with the most likely life events) for the customer's request for assistance. For example, as previously described with respect to FIGS. 2 and 3, the switch may consider/analyze the life event information included in the customer's account (and/or included in the customer's request for assistance) without applying it to the historical (e.g., aggregate) statistical models generated from previous call data to the customer's life event information. Thus, the switch may route the customer to the appropriate representatives, or provide appointment information to the customer, without considering data amassed from previous callers.

Alternatively, as previously described, the switch may implement aggregate statistical models to the available life event information in the customer's account, where each aggregate statistical model represents a particular call route path (e.g., to a customer service representative trained to handle a particular life event). The switch may apply life event data (e.g., a data fingerprint) to all, or a subset, of the available aggregate statistical models, and generate a probability score for each aggregate statistical model based on an extent by which the customer's parameters (e.g., life event information) relate to the call routing channel corresponding with the aggregate statistical model. After generating probability scores for each of the aggregate statistical models, the switch may determine which model(s) are most relevant.

After determining a most likely reason for the call (e.g., corresponding with a customer service representative capable of handling the reason for the call), the switch may send appointment details to the customer and to the customer service representatives, or the switch may route the customer to the appropriate customer service representatives (e.g., if the customer is seeking real-time assistance over the phone) (block 122). For example, the switch may message (e.g., via email or text message) the customer and provide a teleconference number and a time and date to call the teleconference number. The switch may send similar information to one or more customer service representatives. In some embodiments, more than one relevant life event may be identified by the switch, where each relevant life event may require assistance from a different customer service representative. Thus, multiple representatives may be made available for assisting the customer. As previously described, the parties (e.g., the customer and the one or more customer service representatives) may communicate through a teleconference number hosted by teleconference servers owned and operated by the business, or by teleconference servers owned and operated by a third party contracted by the business, or by any other communication means (e.g., real-time chat) made available by the call center.

The method 110 also includes providing assistance to the customer (block 124). For example, as described above, the parties (e.g., the customer and the one or more customer service representatives) may communicate, for example, by phoning into a teleconference number. Alternatively, the customer may be routed to the teleconference number, along with the one or more customer service representatives. If multiple customer service representatives are notified by the switch of the appointment, the multiple customer service representatives and customer may spend an initial portion of the meeting determining which of the multiple customer service representatives is most helpful. After determining that certain of the multiple customer service representatives are not needed, the representatives that are not needed may leave the conversation.

As previously described, because the method 110 may include a teleconference that requires assistance from multiple customer service representatives, the method 110 may encompass a premium service that requires payment by the customer. For example, in some embodiments, the method 110 may be reserved from premium services, such as financial advisement services. Accordingly, the customer may be required to pay for the premium service before, during, or after the customer service appointment.

While only certain features of the disclosure have been illustrated and described herein, many modifications and changes will occur to those skilled in the art. It is, therefore, to be understood that the appended claims are intended to cover all such modifications and changes as fall within the true spirit of the invention.

The invention claimed is:

1. A method of routing a customer call to a desired representative of a call center, comprising:
receiving the customer call from a customer;
identifying, within a database saved to a server, a customer account corresponding with the customer;
identifying data indicative of one or more life event entries saved to the customer account and corresponding with one or more life events of the customer;
applying the identified data indicative of the one or more life event entries to a plurality of history-based statistical models, wherein each history-based statistical model of the plurality of history-based statistical models represents a corresponding call routing channel;
assigning a probability score for each history-based statistical model of the plurality of history-based statistical models, wherein each probability score represents a likelihood that the corresponding call routing channel represented by the history-based statistical model is desired by the customer; and
routing, via a processor of a switch and based on the probability scores, the customer call to the desired representative through the corresponding call routing channel, wherein the corresponding call routing channel is associated with the desired representative.

2. The method of claim 1, wherein assigning the probability score for each history-based statistical model of the plurality of history-based statistical models comprises, by applying the identified data indicative of the one or more life event entries to the plurality of history-based statistical models, inputting to the plurality of history-based statistical models a type of each life event of the one or more life events, a date of occurrence of each life event of the one or more life events, a date of entry of each life event entry of the one or more life event entries, or a combination thereof.

3. The method of claim 1, wherein assigning the probability score for each history-based statistical model of the plurality of history-based statistical models comprises, by applying the identified data indicative of the one or more life event entries to the plurality of history-based statistical models, inputting to the plurality of history-based statistical models a first proximity between a time of receipt of the customer call from the customer and a date of occurrence of each life event of the one or more life events, a second proximity between the time of receipt of the customer call from the customer and a date of entry of each life event entry of the one or more life event entries, or a combination thereof.

4. The method of claim 1, comprising inputting, to one or more algorithms configured to generate and/or update at least one history-based statistical model of the plurality of history-based statistical models, the data indicative of the one or more life event entries saved to the customer account, and the call routing channel corresponding with the desired service representative which resulted from the customer call by the customer.

5. The method of claim 1, comprising querying the customer regarding an accuracy of the call routing channel and the corresponding desired service representative corresponding with a highest probability score of the assigned probability scores for each history-based statistical model.

6. The method of claim 1, comprising:
receiving the data indicative of the one or more life event entries; and
saving the data indicative of the one or more life event entries to the customer account in the database saved to the server.

7. The method of claim 6, wherein the method comprises linking the customer account to one or more other agents such that the data indicative of the one or more life event entries are received from the one or more other agents.

8. The method of claim 7, wherein the one or more other agents comprise a banking institution account, an academic institution account, a social media account, a government institution account, or a combination thereof.

9. The method of claim 7, comprising scrubbing or scanning the one or more other agents to gather the data indicative of the one or more life event entries.

10. The method of claim 6, comprising linking the customer account to one or more wearable devices worn by the customer such that the data indicative of the one or more life event entries is received from the one or more wearable devices.

11. The method of claim 10, wherein the one or more wearable devices comprise one or more medical devices that monitor(s) one or more vital(s) of the customer.

12. The method of claim 1, wherein the method comprises querying the customer only for identification verification.

13. A system for routing a customer call to a desired representative of a call center, comprising:
a server configured to store a customer account corresponding with a customer thereon, wherein the customer account comprises a data fingerprint comprising a plurality of life event entries corresponding with the customer;
one or more processors configured to apply, in response to the customer call from the customer, the data fingerprint to a plurality of history-based statistical models to generate a probability score for each history-based statistical model of the plurality of history-based statistical models, wherein each history-based statistical model of the plurality of history-based statistical models represents a corresponding call routing channel, and wherein each probability score represents a likelihood that the corresponding call routing channel is desired by the customer; and
a switch having processing circuitry configured to automatically route the customer call, based at least in part on the probability scores of the plurality of history-based statistical models, through one of the corresponding call routing channels.

14. The system of claim 13, wherein the server is configured to receive at least a portion of the data fingerprint from one or more agents of the customer.

15. The system of claim 14, wherein the one or more agents comprises a banking institution account, an academic institution account, a social media account, a government institution account, or a combination thereof.

16. The system of claim 14, comprising a scrubber configured to scan the one or more agents to identify at least a portion of the data fingerprint.

17. The system of claim 13, comprising a wearable device directly or indirectly in wireless communication with the server, wherein the server is configured to receive from the wearable device at least a portion of the data fingerprint.

18. A call routing system, comprising:
a server configured to host a database having a customer account stored thereon, wherein the customer account corresponds with a customer, and wherein the customer account comprises a data fingerprint having data indicative of a plurality of life event entries of the customer;
a switch having at least one processor and memory, wherein the memory is configured to store instructions thereon that, when executed by the processor, cause the switch to:
identify the customer corresponding with a customer call from the customer;
retrieve or receive, from the database hosted by the server, the data indicative of the plurality of life event entries from the customer account corresponding with the customer;
apply the data indicative of the plurality of life event entries to a plurality of history based statistical models, wherein each history-based statistical model of the plurality of history-based statistical models represents a corresponding call routing channel;
generate a plurality of probability scores corresponding with the plurality of history based statistical models, wherein each probability score of the plurality of probability scores represents a likelihood that the call routing channel corresponding with the corresponding history-based statistical model of the plurality of history-based statistical models is desired by the customer; and
route the customer call to one of the corresponding call routing channels based at least in part on the plurality of probability scores.

19. The system of claim 18, comprising a scrubber configured to scan one or more agents of the customer to detect a first life event entry, wherein the first life event entry is received by the server, stored to the data fingerprint of the customer account, and included in the plurality of life event entries.

20. The system of claim 19, wherein the one or more agents comprises a banking institution account, an academic institution account, a social media account, a government institution account, or a combination thereof.

* * * * *